J. A. FAIRBANKS.
BRIDLE-BIT.
No. 172,562. Patented Jan. 25, 1876.
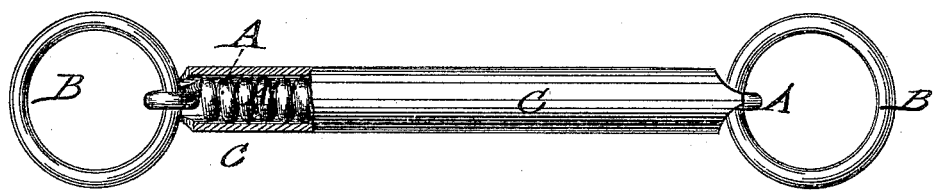
WITNESSES:
INVENTOR:
J. A. Fairbanks
BY
ATTORNEYS.

UNITED STATES PATENT OFFICE.

JOHN A. FAIRBANKS, OF BOSTON, MASSACHUSETTS.

IMPROVEMENT IN BRIDLE-BITS.

Specification forming part of Letters Patent No. 172,562, dated January 25, 1876; application filed November 19, 1875.

*To all whom it may concern:*

Be it known that I, JOHN A. FAIRBANKS, of Boston, Suffolk county, Massachusetts, have invented an Improved Overdraw or Check-Rein Bit, of which the following is a specification:

The drawing represents a side view, partly broken away.

The invention consists in an overdraw or check-rein bit, formed of a spiral spring, connected with and allowing the rein-rings to spread to a greater or less distance apart, thus allowing sufficient lateral play of the horse's head to enable him to use it in balancing himself when trotting.

A represents a spiral spring, with its coils close together and evenly wound, ending in a loop at each end to connect with the rein-rings B B. In order to prevent the coils from catching the tongue of the animal when they contract together, I prefer to cover spring-bit with a rubber or other suitable protecting case or tube, C. This bit is preferably used only for the overdraw-rein, and is specially adapted to the purpose of holding up the animal's head, but not too rigidly.

I am aware that bridle-bits have been constructed with a spiral spring encircling a bar, rod, or chain, but to construct a bit of a spiral spring alone I believe to be novel.

What I claim as new is—

An overdraw or check-rein bit, made of a spiral spring, A, connected by end loops with the rein-rings B B, as shown and described.

JOHN A. FAIRBANKS.

Witnesses:
T. B. MOSHER,
ALEX. F. ROBERTS.